US012716387B2

(12) United States Patent
Durand et al.

(10) Patent No.: US 12,716,387 B2
(45) Date of Patent: Aug. 25, 2026

(54) METHOD OF OPERATING AN AIRCRAFT ENGINE AND FUEL SYSTEM USING MULTIPLE FUEL TYPES

(71) Applicant: PRATT & WHITNEY CANADA CORP., Longueuil (CA)

(72) Inventors: Sean Durand, Brossard (CA); Harris Shafique, Longueuil (CA); David Waddleton, Candiac (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 167 days.

(21) Appl. No.: 17/116,410

(22) Filed: Dec. 9, 2020

(65) Prior Publication Data

US 2022/0178306 A1 Jun. 9, 2022

(51) Int. Cl.

| | |
|---|---|
| ***F02C 7/224*** | (2006.01) |
| ***B64D 27/10*** | (2006.01) |
| ***B64D 37/30*** | (2006.01) |
| ***B64D 37/34*** | (2006.01) |

(52) U.S. Cl.

CPC .............. *F02C 7/224* (2013.01); *B64D 27/10* (2013.01); *B64D 37/30* (2013.01); *B64D 37/34* (2013.01); *F05D 2220/323* (2013.01); *F05D 2240/35* (2013.01)

(58) Field of Classification Search

CPC .................................. F02C 7/224; F02C 7/14

See application file for complete search history.

(56) References Cited

U.S. PATENT DOCUMENTS

| | | | | |
|---|---|---|---|---|
| 3,382,672 | A | 5/1968 | French | |
| 6,182,435 | B1 * | 2/2001 | Niggemann | F01D 25/12 60/730 |
| 9,441,786 | B2 * | 9/2016 | Streifinger | F01D 25/18 |
| 9,656,792 | B2 | 5/2017 | Kamath et al. | |
| 9,695,750 | B2 | 7/2017 | Wollenweber | |
| 2016/0076461 | A1 * | 3/2016 | Kawai | B64D 37/30 60/39.463 |
| 2016/0281656 | A1 * | 9/2016 | Alecu | F02C 7/14 |
| 2017/0227425 | A1 * | 8/2017 | Martucci | G01N 33/22 |
| 2018/0215479 | A1 * | 8/2018 | Logan | F02C 7/14 |
| 2019/0309687 | A1 * | 10/2019 | Klonowski | H01L 25/072 |

FOREIGN PATENT DOCUMENTS

| | | |
|---|---|---|
| FR | 2931885 A1 | 12/2009 |

* cited by examiner

*Primary Examiner* — Phutthiwat Wongwian
*Assistant Examiner* — Jacek Lisowski
(74) *Attorney, Agent, or Firm* — Norton rose fulbright Canada LLP

(57) ABSTRACT

The fuel system can have a jet fuel subsystem having a jet fuel conduit extending from a first reservoir area to a fuel nozzle across an auxiliary system operable using a flow of the jet fuel, at least one fuel delivery system operable to circulate a controlled flow rate of the jet fuel within said conduit and across the auxiliary system, a recirculation conduit branching off from the jet fuel conduit downstream of the auxiliary system, an actuator valve operable to selectively direct a flow of jet fuel to the at least one fuel nozzle or to the recirculation conduit; and an alternative fuel subsystem having an alternative fuel conduit extending from a second reservoir area to a fuel nozzle.

19 Claims, 7 Drawing Sheets

45
52
60

45
52
45
60

100
104
102
106

100
104
106
102

100
102
106

100
104
102
108
106
110

100
104
106
102

METHOD OF OPERATING AN AIRCRAFT ENGINE AND FUEL SYSTEM USING MULTIPLE FUEL TYPES

TECHNICAL FIELD

The application relates generally to gas turbine engines and, more particularly, to the use of alternative fuels for propulsion.

BACKGROUND OF THE ART

Traditionally, gas turbine engines designed for use on aircrafts are fueled by jet fuel. Jet fuel is maintained in a liquid state throughout the aircraft operating conditions The fuel is stored and transferred within the fuel system in a liquid state. Jet fuel encompasses a group of different fuel types such kerosene-type fuels and naphtha-type fuels, for instance.

Concerns such as climate impact considerations have motivated the use alternative fuels which can be gaseous at atmospheric conditions, and may require to be stored and/or conveyed in gaseous form, such as hydrogen or natural gas, in lieu of traditional jet fuels. However, using such fuels in flight, and especially, but not exclusively, retrofitting the gaseous fuel capacity to an existing aircraft fuel systems, can pose some significant design/engineering challenges.

Hydrogen, for instance, has a much lower volumetric energy density compared to conventional jet fuels—roughly 25%—when stored and used in gaseous form. This represents a significant challenge from an airframe design perspective as four times the volume would need to be carried to have the same energy loaded onto the aircraft. For this reason hydrogen is traditionally considered better suited to smaller aircraft, such as those used in the general aviation or regional aircraft segments. Though it is not impossible, storing hydrogen in liquid form poses another set of engineering challenges, including the challenge of maintaining the hydrogen at very low temperatures.

Other limitations of using alternative fuels in gaseous state is that in many aircrafts, at least one, and sometimes several, auxiliary systems, including engine systems such as driving actuators, oil coolers, etc., were designed to operate based on the liquid fuel flow. "Fuel-draulic" actuators, used in operating auxiliary engine hardware, require an incompressible liquid as a driving medium. Heat exchangers, typically referred to as "fuel to oil heat exchangers" (FOHE), were used to cool the engine oil system while simultaneously heating the liquid fuel, thereby achieving a dual efficiency. Other auxiliary systems may require the use of liquid fuel flow or pressure. Adaptation of these auxiliary systems to function on gaseous fluid may be technically complicating to implement or economically prohibitive in adapting an existing application intended to leverage the use of an alternative fuel in the aircraft.

Accordingly, there remained room for improvement, including in terms of providing technology which will facilitate the implementation of alternative fuel use in aviation.

SUMMARY

In one aspect, there is provided a method of operating an aircraft gas turbine engine having at least one fuel nozzle open to a combustion chamber, the method comprising, simultaneously: conveying a controlled flow rate of jet fuel across at least one auxiliary system, including the at least one auxiliary system using the controlled flow rate of jet fuel for operation; returning at least a portion of the flow rate of jet fuel from downstream of the at least one auxiliary system to upstream of the at least one auxiliary system; and conveying a controlled flow rate of an alternative fuel from a reservoir area of the aircraft to the at least one fuel nozzle.

In another aspect, there is provided a fuel system for a gas turbine engine having at least one fuel nozzle open to a combustion chamber, the fuel system comprising: a jet fuel subsystem having a jet fuel conduit extending from a first reservoir area to the at least one fuel nozzle across at least one auxiliary system operable using a flow of said jet fuel, at least one fuel delivery system operable to circulate a controlled flow rate of the jet fuel within said conduit and across the at least one auxiliary system, a recirculation conduit branching off from the jet fuel conduit downstream of the at least one auxiliary system, and an actuator valve operable to selectively direct a flow of jet fuel to the at least one fuel nozzle or to the recirculation conduit; and an alternative fuel subsystem having an alternative fuel conduit extending from a second reservoir area to said at least one fuel nozzle.

In a further aspect, there is provided an aircraft having a gas turbine engine having a gas turbine engine having at least one fuel nozzle open to a combustion chamber and a fuel system comprising: a jet fuel subsystem having a jet fuel conduit extending from a first reservoir area to said at least one fuel nozzle across at least one auxiliary system operable using a flow of said jet fuel, at least one fuel delivery system operable to circulate a controlled flow rate of said jet fuel within said conduit and across said at least one auxiliary system, a recirculation conduit branching off from the jet fuel conduit downstream of the at least one auxiliary system, and an actuator valve operable to selectively direct a flow of jet fuel to the at least one fuel nozzle or to the recirculation conduit; an alternative fuel subsystem having an alternative fuel conduit extending from a second reservoir area to said at least one fuel nozzle.

DESCRIPTION OF THE DRAWINGS

Reference is now made to the accompanying figures in which.

DETAILED DESCRIPTION

Figure 1:
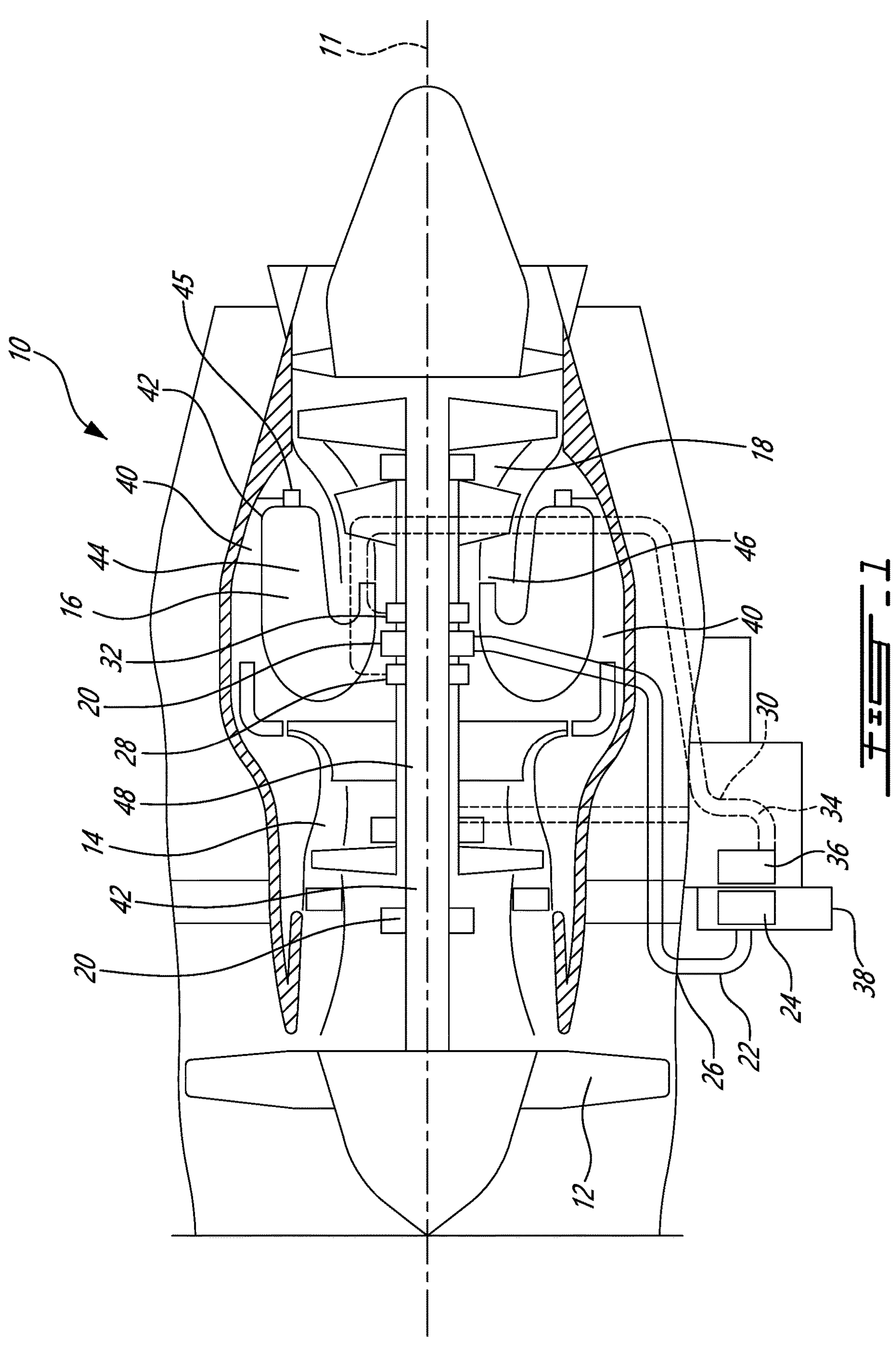
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases around the engine axis 11, and a turbine section 18 for extracting energy from the combustion gases.

The compressor 14, fan 12 and turbine 18 have rotating components which can be mounted on one or more shafts 48. Bearings 20 are used to provide smooth relative rotation between a shaft 48 and casing (non-rotating component), and/or between two shafts which rotate at different speeds. An oil lubrication system 22 including an oil pump 24, sometimes referred to as a main pump, and a network of conduits and nozzles 26, is provided to feed the bearings 20 with oil. Seals 28 are used to contain the oil. A scavenge system 30 having cavities 32, conduits 34, and one or more scavenge pumps 36, is used to recover the oil, which can be in the form of an oil foam at that stage, from the bearings 20. The oil pump 24 typically draws the oil from an oil reservoir 38, and it is relatively common to use some form of air/oil separating device in the return line.

The combustor 16 can be comprised of a gas generator case 40 which acts as a vessel to the pressurized air exiting the compressor section 14, and the generator case 40 can house one or more liners 42. The gas generator case 40 can thus be said to have an inlet fluidly connected to the compressor flow path. The liners 42 are typically apertured components delimiting a combustion chamber 44. The compressed air can thus enter the combustion chamber 44 through the apertures in the liner 42, a fuel nozzle 45 can be secured to the liner 42 for introducing a jet of fuel in the combustion chamber 44, and the combustion is typically self-sustained after initial ignition. The liners 42 can be said to have an outlet 46 fluidly connected to the turbine section 18. The fuel nozzles 45 can be said to be open to the combustion chamber 44 in the sense that they have an outlet 46 configured for directing the fuel into the combustion chamber 44.

Gas turbine engines such as the example shown in FIG. 1, as well as many other types of gas turbine engines such as turboprop, turbofan and hybrid-electric gas turbine engines were traditionally designed with fuel systems designed to run exclusively on jet fuel. One of the limitations of using alternative fuels, such as hydrogen or natural gas for example, was the volumetric energy density of such alternative fuels which could severely impact the range of the aircraft. Other limitations of using alternative fuels, especially if such alternative fuels are to be conveyed within the fuel system in a gaseous state, is that in many aircrafts, at least one, and sometimes several, auxiliary systems including fuel driven actuators (aka fuel-draulic actuators), oil system thermal management, etc., were designed to use the liquid fuel flow (e.g. its pressure, flow, and/or heat capacity) for their intended, normal operation.

An alternative approach to address the issue of volumetric energy density is providing the aircraft with a hybrid or dual fuel system. Such approaches can be classified in to one of two general categories: either the fuel system is designed with a capability to simultaneously hold both a jet fuel and an alternative fuel, or the fuel system is designed with a capability to selectively hold a jet fuel or an alternative fuel. For shorter missions, the flight could be entirely based on an alternative fuel, whereas for larger missions the flight could be entirely based on jet fuel. In the case of simultaneously holding two types of fuels, a shorter mission could be based largely, or mostly, on an alternative fuel, with potentially some high thrust segments of the mission also using conventional liquid kerosene based fuels. Alternatively, for longer flights the flight could be predominantly based on traditional kerosene based fuels while still maximizing the use of an alternative fuel within the predetermined flight envelope. This can be an attractive approach, as the majority of flights completed by aircrafts with 8-10 hour flight time ranges are still in the range of 1-2 hours. Maximizing the use of alternative fuels during the short flights, which represent the main source of use, can produce significant reduction in carbon based emissions.

As will now be described in further detail, it was found that at least in some embodiments, using an approach where the aircraft fuel system combined a first fuel, such as a liquid fuel like jet fuel, and alternative fuel capacity, including simultaneous flow rate capacity, where a variable quantity of jet fuel could be circulated at least across the auxiliary systems requiring a flow of jet fuel for operation, in all flight configurations, complemented with a given quantity of alternative fuel when and where appropriate, could be advantageous. Indeed, it was found that at least in some embodiments, using an approach where a gas turbine aircraft is equipped with a dual hybrid fuel system consisting of a conventional jet fuel system in parallel with a novel alternative fuel system controlling and metering a different type of liquid or gaseous fuel with both systems terminating at the combustor, could be advantageous.

Figure 2:
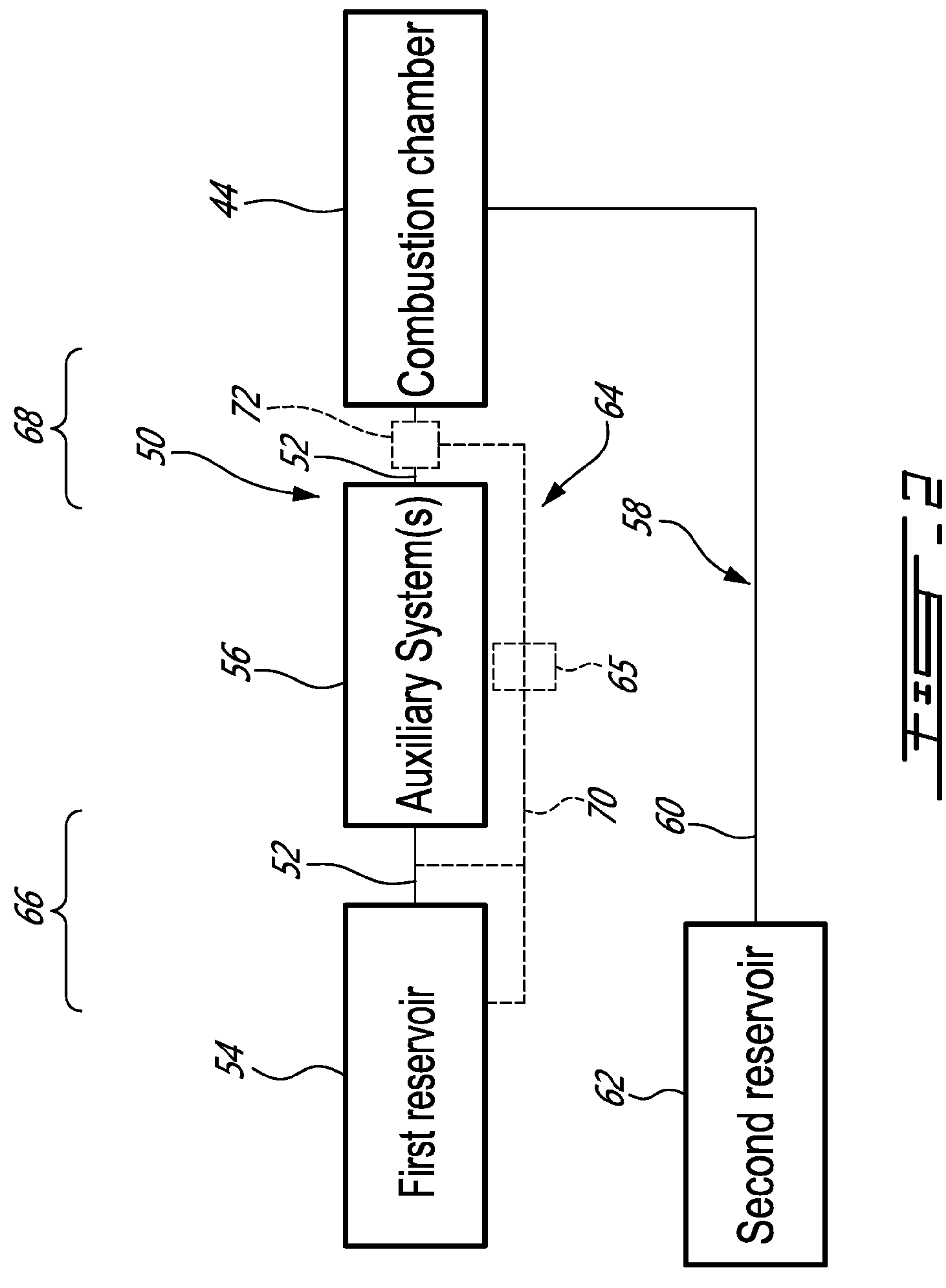
FIG. 2 is a block diagram of a fuel system for a gas turbine engine.
Figures 3A, 3B:
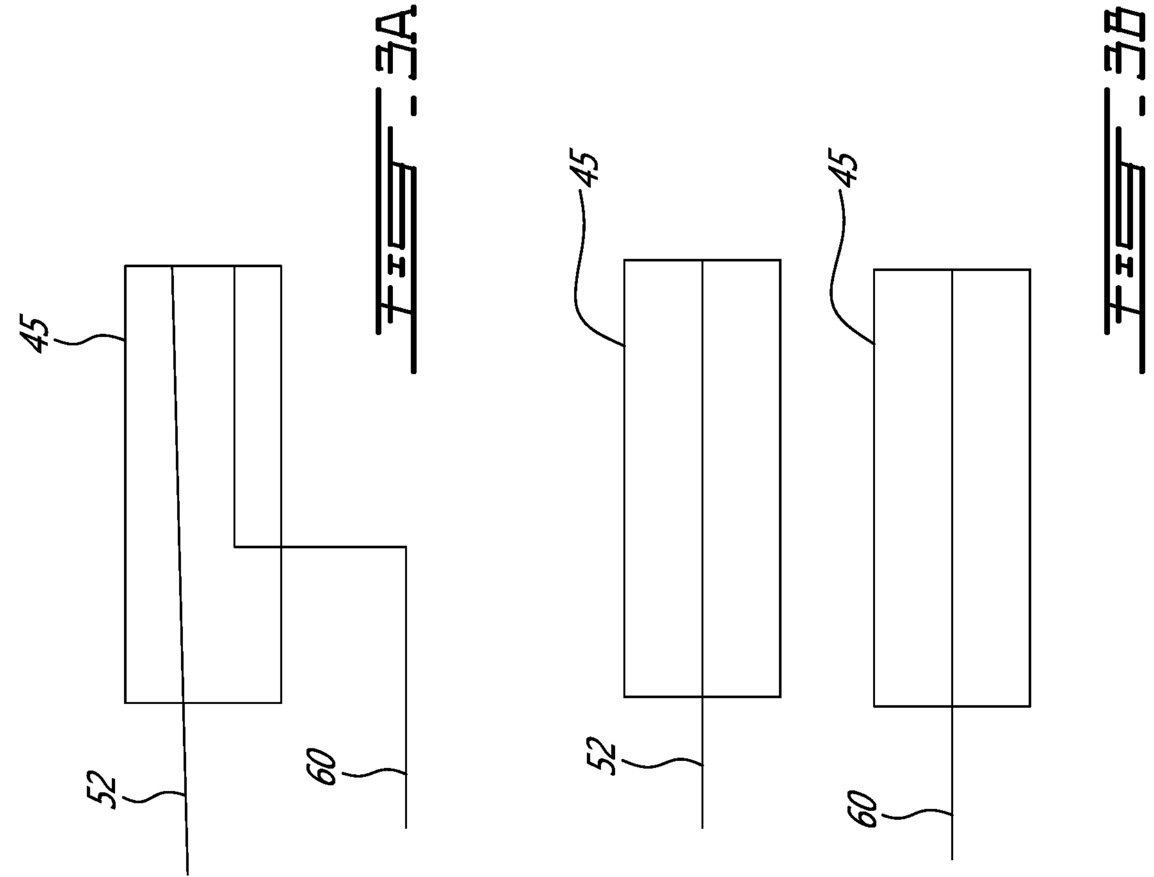
FIG. 3A and 3B are schematic views presenting two example fuel nozzle configurations.

A general block diagram of such a fuel system is presented in FIG. 2. A first fuel subsystem 50 can include, in addition to a suitable jet fuel conduit 52 network, any suitable fuel delivery system such as one or more pumps to convey a controlled (e.g. metered) flow rate of jet fuel from a first reservoir area 54 to the nozzles 45 in the combustor 16, along the jet fuel conduit 52, across/via any auxiliary system 56 which requires the jet fuel for operation, such as a heat exchanger or an actuator, for instance. In parallel, a second fuel subsystem 58 can include an alternative fuel conduit 60, as well as any suitable device to convey a controlled (e.g. metered) flow rate of an alternative fuel from a second reservoir area 62 to the nozzles 45 in the combustor 16. The alternative fuel, especially if gaseous, will typically require different conduit sizes than liquid fuel. At the fuel nozzles 45, the different conduit sizes can be implemented via different fuel nozzles 45 respectively for the jet fuel 52 and for the alternative fuel 60, such as schematized in FIG. 3B, or simply by different conduits or paths 52, 60 within the same fuel nozzle(s) 45, as schematized in FIG. 3A. The fuel nozzle type and size requirements for gaseous fuel will be different than those typically found in kerosene based applications. The first and second reservoir areas 54, 62 can be distinct reservoirs, or different sections of a same reservoir, depending on the application.

Figures 4A, 4B, 4C:
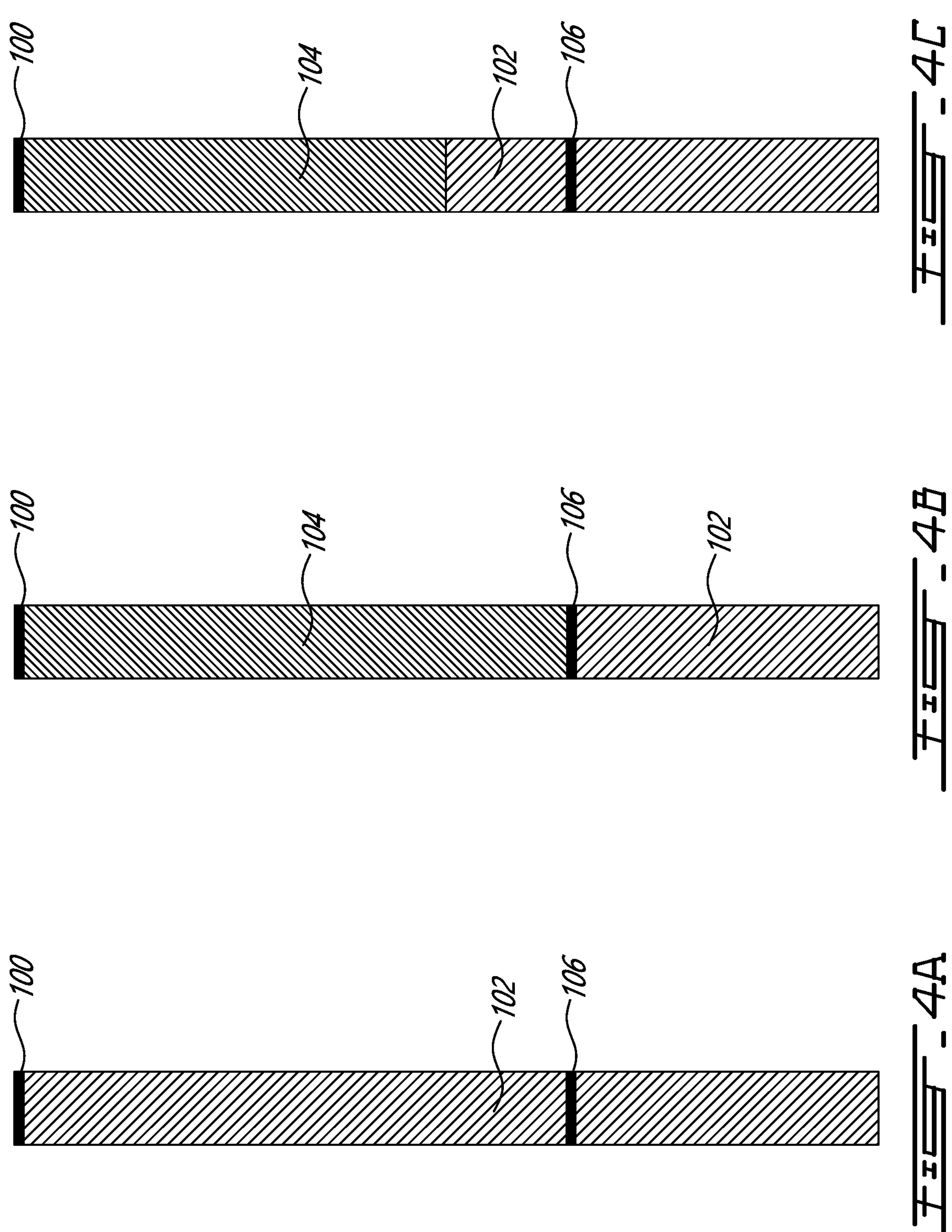
FIGS. 4A to 4E are line graphs schematically representing fuel flow rates for a gas turbine engine relative to a power requirement of the engine.

Indeed, in this manner, a total required power of the engine 100, schematized by the tip of the line graphs of FIGS. 4A-4D, can be satisfied with either purely a corresponding flow rate of jet fuel 102, such as schematized in FIG. 4A, or the sum of respective flow rates of jet fuel 102 and of an alternative fuel 104, such as schematized in FIG. 4B and 4C. In some embodiments, the flow rate of jet fuel 102 can be marginal, so as to maximize the use of alternative fuel when possible. For example, as presented above, one or more auxiliary system may require a minimum jet fuel flow rate 106, represented as the corresponding vertical position along the line graphs of FIGS. 4A to 4D. As presented in the line graphs, using such a system, there are various ways by which both the total required power requirement 100 and the minimum jet fuel flow rate 106 requirement can be satisfied. The line graph of FIG. 4A presents a traditional way to satisfy both requirements, which is to satisfy both requirements entirely with jet fuel 102. By providing sufficient jet fuel flow rate 102 to satisfy the total required power 100, the jet fuel flow rate 102 simultaneously satisfies the minimum jet fuel flow rate 106. The line graphs of FIG. 4B to 4C present two exemplary, alternate ways of satisfying both these requirements using a duel fuel system. It is understood that other combinations exist.

In FIG. 4B, a minimum flow rate of jet fuel 102 needed to satisfy the minimum jet fuel flow rate requirement 106 is conveyed to the combustor 16, whereas the remaining amount of power requirement is satisfied by a corresponding amount of alternative fuel flow rate 104. This scenario maximises the use of the alternative fuel, and may be particularly useful in short flights, for instance. In some alternate embodiments, and especially longer flights for instance, it may be impossible to achieve sufficient total on-board energy given the limited capacity of the fuel reservoir(s), and it may thus be preferred to favor a greater proportion of the higher energy density jet fuel over the lower energy density alternative fuel, a scenario presented in FIG. 4C.

Figure 4E:
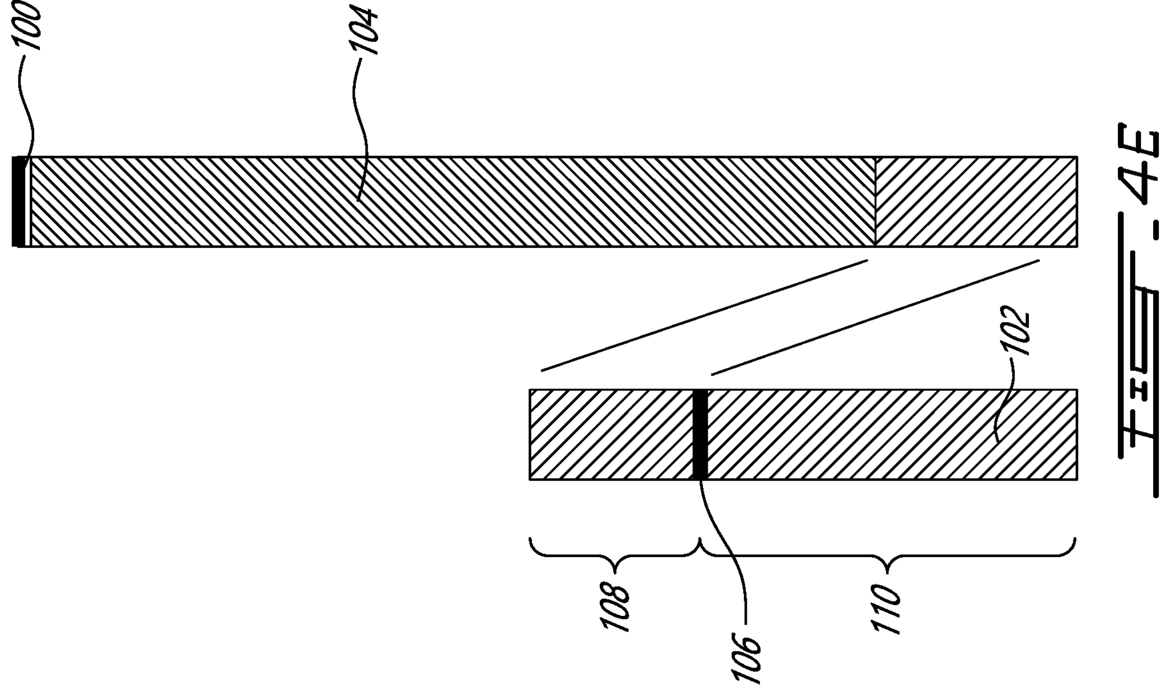
Figure 4D:
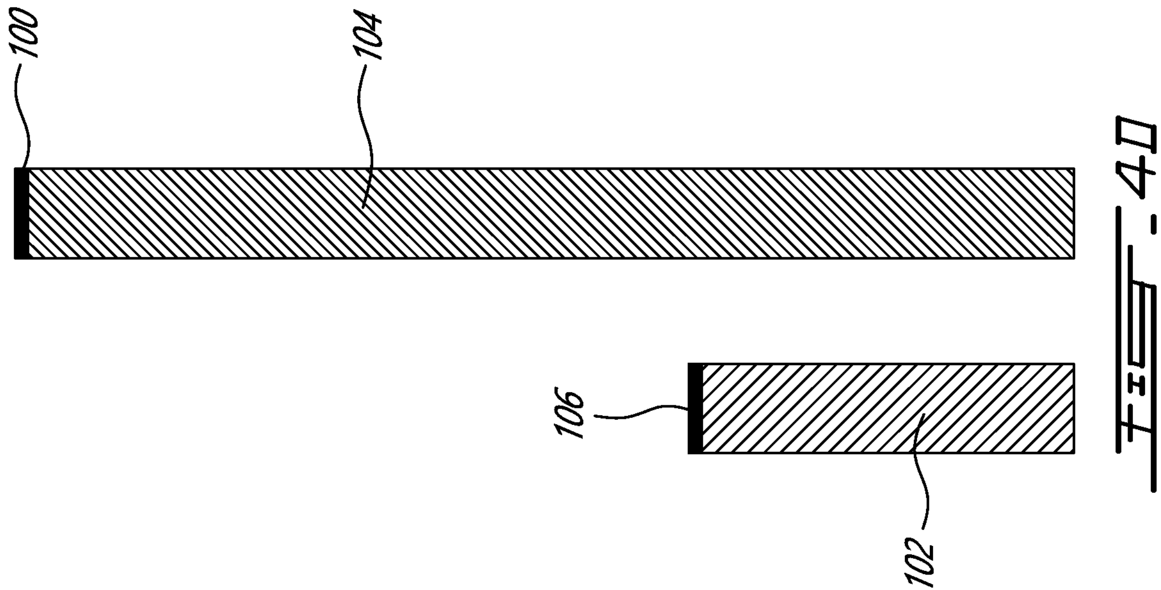

In still further embodiments, such as the one illustrated in FIG. 4D, it may be preferred to entirely satisfy the total power requirement 100 entirely via the alternative fuel flow rate 104. Since the minimum jet fuel flow rate requirement 106 is not satisfied by the alternative fuel flow rate 104, it may be desired to circulate the minimum jet fuel flow rate 102 across the auxiliary system(s) which require it for their operation. It is possible to circulate jet fuel across the auxiliary system(s) without delivering jet fuel to the combustor 16 at all, and this can be achieved by entirely recirculating the jet fuel flow rate 102 from downstream 68 of the auxiliary system(s) 56 to upstream 66 of the auxiliary system(s) 56.

FIG. 4E presents still another variant. In the example of FIG. 4E, a portion 108 of the jet fuel flow rate 102 circulated across the auxiliary system(s) 56 is delivered to the combustor 16, whereas another portion 110 of the jet fuel flow rate 102 circulated across the auxiliary system(s) 56 is branched off downstream 68 of the auxiliary system(s) 56 and recirculated upstream 66. This scenario may be useful in some cases to satisfy requirements of one or more embodiments. It will also be noted that in alternate embodiments, there can be more than one jet fuel circulating, totalling the jet fuel flow rate 102 and/or more than one alternative fuel circulating, totalling the alternative fuel flow rate 104, for instance.

It will be understood in view of the above that the actual proportion of the respective flows of the first fuel and of the second fuel can vary significantly from one embodiment to another, from one mission to another, and even during a mission. The minimal flow of the first fuel required to sustain the operation of the one or more auxiliary system can represent between 3 and 50% of the total flow rate of both fuels, between 5 and 40%, or between 10 and 20%, to name some examples.

Accordingly, referring back to FIG. 2, the jet fuel subsystem 50 can further include a recirculation conduit 64 branching off from the jet fuel conduit 52 downstream 68 of the one or more auxiliary system 56 which operates using the flow of jet fuel 102, and returns a full or partial flow of the jet fuel upstream 66 of the auxiliary system 56. As will be seen below, in one example scenario, the returned flow of jet fuel can be returned into the jet fuel conduit 52 upstream 66 of the one or more auxiliary system 56. In some cases, such as when the one or more auxiliary system introduces heat into the jet fuel, this scenario may require introducing a heat exchanger 65 in the path of the return conduit 64 to evacuate heat from the jet fuel. In another example scenario, the returned flow of jet fuel can be returned into the first reservoir area 54. In some cases, when the one or more auxiliary system(s) 56 introduces heat into the jet fuel, the heat can simply be evacuated by conduction with the walls of the reservoir and then convention, or a heat exchanger can be introduced in the return line 70 to assist in evacuating heat from the returned flow rate of jet fuel. Hybrid scenarios are possible where, for instance, a portion of the jet fuel is returned to the first reservoir area 54 whereas another portion of the returned jet fuel is returned directly into the jet fuel conduit 52 upstream 66 of the one or more auxiliary system(s) 56. In example embodiments where a recirculation conduit 64 is used to return a portion or all of the flow rate from downstream 68 to upstream 66 of the one or more auxiliary system(s), an actuator valve 72 can be introduced at the junction between the jet fuel conduit 52 and the recirculation conduit 64, and be selectively operable to direct the jet fuel either entirely to the combustion chamber 44, entirely to the recirculation conduit 64, or partially to both in corresponding proportions.

In accordance with one aspect, embodiments can involve delivering a simultaneous flow of jet fuel and alternative fuel to the combustor 16.

Indeed, when using an alternative fuel was desired, maintaining the operation of a limited amount of jet fuel in parallel for auxiliary system operation could be advantageous. Simultaneous to the delivery of a flow of an alternative fuel 104 to the combustor 16, a reduced, potentially minimized, flow of jet fuel 102 to the combustor 16 can be maintained for any suitable reason. Suitable reasons can include cooling, fuel-draulic actuator operation, and even preventing coking or the like in the jet fuel paths within the fuel nozzle(s) (in which case the fuel nozzles themselves can be considered auxiliary systems), for instance.

The two subsystems can thus be used in tandem/simultaneously when operating with hydrogen gas as the primary fuel for engine power/thrust. Accordingly, a minimal flow of jet fuel 106 can be sustained to support the operation of any auxiliary system 56 which requires it, while the rest of the fuel burned can be the alternative fuel, or a different proportion of jet fuel and alternative fuel can be simultaneously used.

Figure 5:
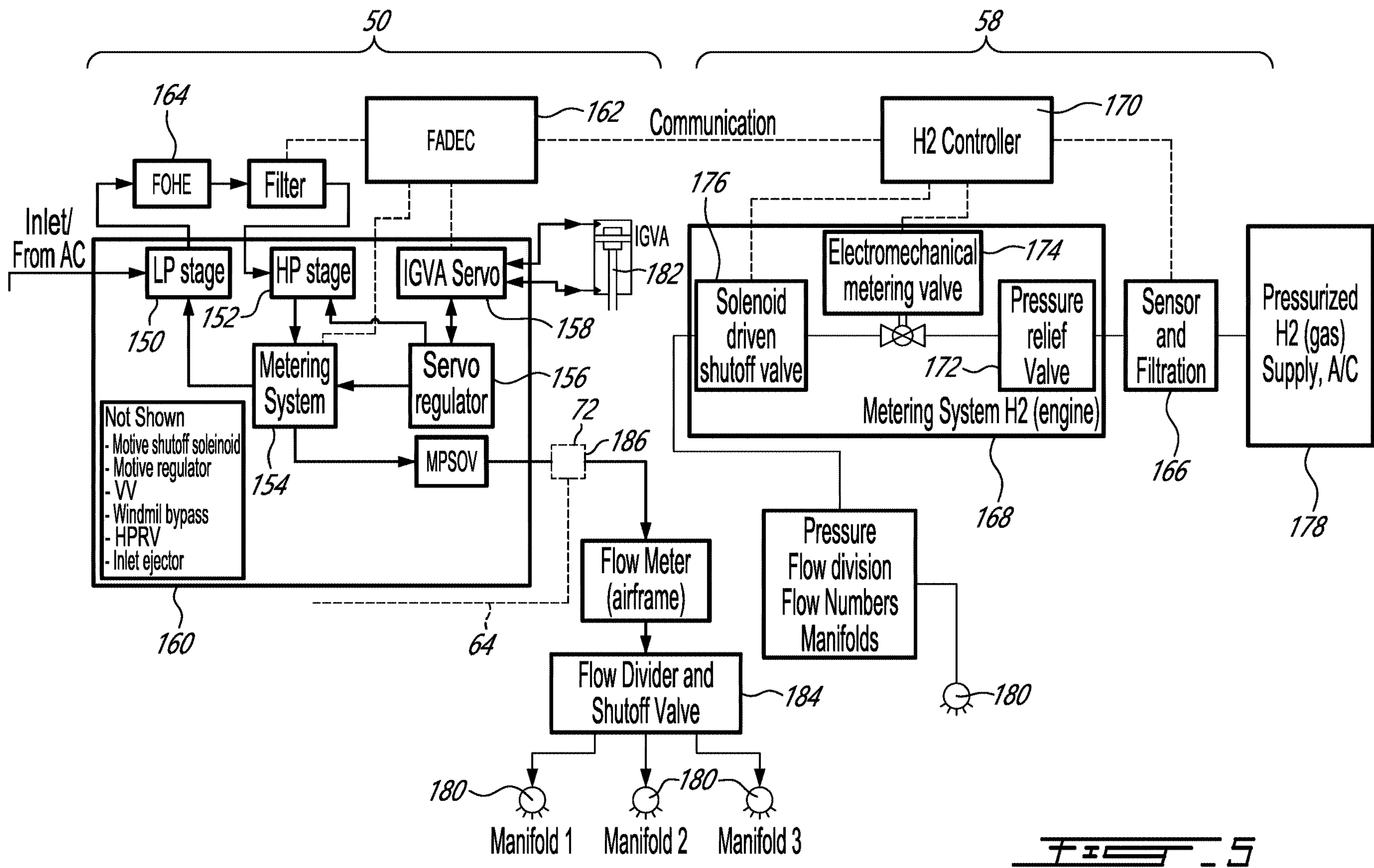
FIG. 5 is a schematic showing an example embodiment of a fuel system for a gas turbine engine.

In accordance with one example embodiment, shown in FIG. 5, the fuel system can include both a first, jet fuel, subsystem 50 and an second, alternative fuel subsystem 58 for a fuel such as, in this example, gaseous hydrogen or natural gas. Both subsystems 50, 58 can be provided with the necessary pumping, plumbing, metering and sensing components. While the engine is operating on gaseous fuel, several challenges for the independent liquid kerosene system may be encountered. Some of these challenges include operation of "fuel-draulic" actuators that control engine compressor geometry, liquid fuel nozzle durability, liquid fuel pump need for fuel to lubricate bearings and overall engine thermal management as the liquid fuel is typically used as a heat sink, notably for cooling the oil. FIG. 5 shows a more detailed example of such a system wherein the two fuel subsystems 50, 58 are plumbed in parallel, but may be routed to common fuel nozzles 45. Because hydrogen is being used in gaseous form, it is expected that the fuel nozzle 45 sizing will not be common to the kerosene fuel so, while the nozzle 45 body may be common, the flow paths 52, 60 can be independent, or different nozzles 45 may be used, as was previously shown in relation to FIG. 3A and 3B.

In the specific example presented in FIG. 5, it will be noted that the fuel delivery system used to circulate the controlled jet fuel flow 50 includes two different pumps 150, 152, including a low pressure stage pump 150 and a high pressure stage pump 152, and a metering system 154 controlled by a servo regulator 156, itself controlled by a IGVA servo 158, and the fuel delivery system 160 is controlled by a jet fuel system controller such as a FADEC 162. Auxiliary systems designed for using the fuel flow during operation are present in this example in the form of a fuel to oil heat exchanger (FOHE) 164, the low pressure stage pump 150, the high pressure stage pump 152, and the fuel nozzles themselves 45. The alternate fuel subsystem is also provided with a fuel delivery system used to circulate a controlled flow rate of the hydrogen or natural gas. In this example, the alternate fuel subsystem's 58 fuel delivery system includes a sensor and filtration 166, and a metering system 168, all controlled via an alternative fuel controller 170. The metering system 168 can include a pressure relief valve 172, an electromechanical metering valve 174, and a solenoid driven shutoff valve 176. The alternate fuel subsystem 58 does not require a pump in this case as the hydrogen or natural gas is pressurized in its distinct reservoir 178. Many alternate fuel delivery system and configurations of auxiliary systems using the flow of fuel for their operation are possible in different embodiments, as will be understood by persons having ordinary skill in the art. It will also be understood that various alternate control schemes are possible, and that the two fuel subsystems can be controlled by the same controller and/or otherwise share common components in alternate embodiments.

When operating on hydrogen gas, for instance, the kerosene fuel control system can be set to the minimum fuel flow required to produce a uniform flow from all the fuel nozzles 45. The standard kerosene system uses a flow division valve to schedule the number of nozzles 45 which are being supplied with fuel based on the flow/back pressure of the commanded fuel flow. For some engines; an idle fuel flow being commanded can provide adequate fuel flow to fully saturate the flow division valve—providing uniform fuel flow to all of the kerosene fuel nozzles.

When commanding an idle fuel flow; the resulting back pressure can be sufficient to support the pressure requirements for actuator support; as well as backpressure required for fuel pump bearing support.

The burned kerosene, which passes through the fuel to oil heat exchanger (FOHE) 164, will also help in extracting heat from the engine oil system. Additionally, by maintaining a minimum liquid fuel flow through the fuel nozzles 45, it can reduce the risk of stagnant residual fuel in the manifolds 180 and fuel nozzle passages from coking and potentially blocking the kerosene fuel nozzles when resuming primary operation on kerosene.

Any kerosene fuel burned while operating on hydrogen will supplement hydrogen required for a given power condition (i.e. continue to result in a targeted total energy consumption), thus extending the range for a given quantity of hydrogen gas on board.

Without the use of a minimum kerosene fuel flow; the system could require an actuation system capable of running off of multiple motive sources (fuel/gas, fuel/pressurized air, fuel/electric). Such modifications could create a significant impact on the architecture of the current flight engine as well as adding weight and complexity to systems which had otherwise been certified and active in production as 'safe for flight' systems.

Moreover, additional heat load caused by not circulating fuel flow could place additional loading on the oil system; which may require the addition if heat exchanger surface area to further dissipate heat generated by the oil system. The oil system is part of the engine core and will have similar loading/heat dissipation requirements regardless of the fuel system in use.

In accordance with another aspect, embodiments can involve recirculating a flow of jet fuel from downstream to upstream of one or more auxiliary system.

Indeed, in some embodiments, a recirculation loop can be present in the jet fuel system to allow a recirculation of jet fuel, which can, in one embodiment, be minimalized and made just sufficient to satisfy requirements of some auxiliary systems which use the circulation of jet fuel, such as cooling or fuel-draulic actuator 182 operation, for instance. Alternately, in some cases, it may be preferred for the recirculation loop to recirculate less than a minimal flow rate 106 of jet fuel, with an additional flow rate of jet fuel simultaneously being conveyed to the combustor 16, for instance.

Accordingly, a minimal flow of jet fuel 106 can be sustained to operate any auxiliary system which requires it while the rest of the fuel burned can be the alternative fuel. The first fuel subsystem 50 has a recirculation conduit 64 branching off from the conduit segment extending between the one or more auxiliary system(s) 56 and the combustor 16, and a valve 72 being selectively operable to partially or fully redirect the flow to the recirculation conduit 64 instead of to the combustor 16.

The jet fuel subsystem 50 can thus be operated to recirculate fuel across the auxiliary system while the alternative fuel subsystem 58 can be used to convey the entirety or a portion of the fuel feeding the combustor 16, for instance.

Referring back to FIG. 5, when operating on hydrogen gas, the kerosene fuel control system can be set to the minimum fuel flow for satisfying any requirement of the auxiliary systems, and this kerosene fuel flow can be partially or fully recirculated across the auxiliary system(s). In one embodiment, a minimum kerosene fuel flow can be maintained to the nozzles 45 to maintain a minimum flow circulation there and prevent potential coking. For some engines; an idle fuel flow being commanded can provide adequate fuel flow to fully saturate the flow division valve 184—providing uniform fuel flow to all of the kerosene fuel nozzles. A solenoid actuated switching valve 186 is introduced here at the branching point of the recirculation path, and the solenoid actuated switching valve 186 can be controlled by the electronic engine controller. The switching valve 186 can be actuated to direct all kerosene flow to the recirculation conduit 64 when the auxiliary fuel, hydrogen gas in this example, is in use.

Figure 6:
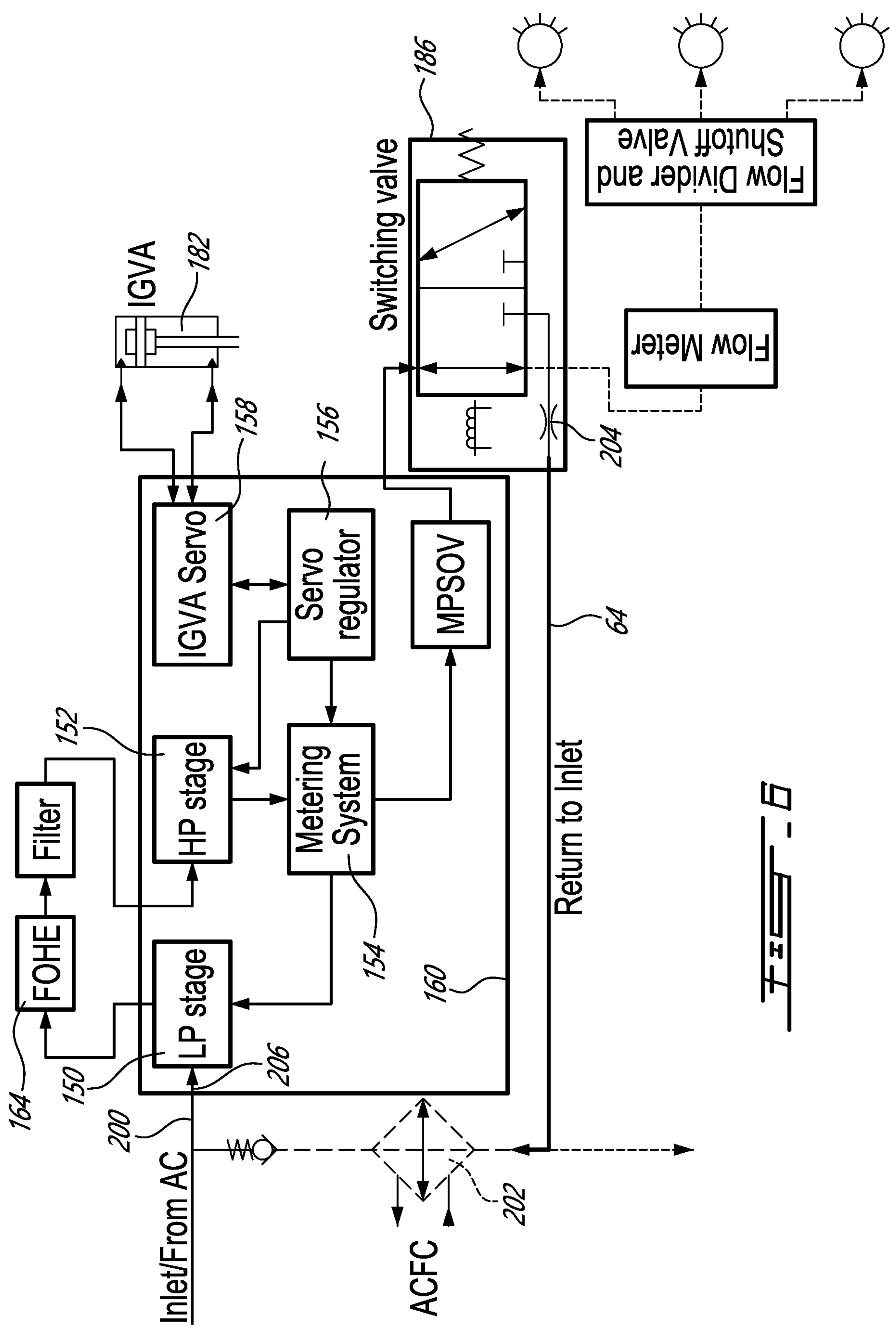
FIG. 6 is a schematic showing an example embodiment of a jet fuel subsystem for a gas turbine engine.

Referring now to FIG. 6, in one potential example embodiment, the recirculation conduit 64 can lead back to an inlet line 200, upstream of any requiring auxiliary system 56 (e.g. heat exchanger or fuel-draulic actuator). Indeed, a kerosene fuel system can contain an additional switchable recirculation conduit 64 returning commanded flow to the system inlet 200 to maintain minimum pressure for fuel-draulic systems and fuel and oil cooling purposes. The recirculation conduit 64 can be provided with an additional heat exchanger 202 allowing to evacuate heat picked up from oil cooling, for instance. The recirculation conduit 64 can include, in sequence, a restricting orifice 204, an air cooled heat exchanger 202, and a connection 206 back to the fuel system inlet 200 for instance.

By implementing the switching valve 186 on the kerosene system when running on hydrogen, the control system can be set to a predetermined 'simulated burn flow' using the kerosene metering valve 154. The diverted flow passing through the restrictor 204 can provide the backpressure required by the kerosene system to support the journal bearings within the fuel control, as well as providing the 'fuel-draulic pressure' required to drive the actuator 182. By then passing the rerouted flow through the added heat exchanger 202 (air cooled fuel cooler (ACFC)), heat extracted from the oil system (through the kerosene fuel oil heat exchanger (FOHE) 164) can be dissipated to the air flow through the ACFC 202. This can avoid any additional loading on the engine oil system or its cooling requirements.

In one alternative example embodiment, the recirculation conduit 64 can lead back to the corresponding fuel reservoir area 54. For instance, a kerosene fuel system can contain an additional switchable path returning commanded flow to the airframe fuel tank to maintain minimum pressure for fuel-draulic systems and fuel and oil cooling purposes.

FIG. 6 also illustrates such an example embodiment in further detail. The solenoid actuated switching valve 186 can be actuated when the hydrogen gas is in use to route the liquid kerosene fuel through a restricting orifice 204 and then back to the airframe fuel tank, rather than to the combustion chamber 16.

By implementing the switching valve 186 on the kerosene system when operating on hydrogen, the control system can set a predetermined 'simulated burn flow' using the kerosene metering valve. The diverted flow passing through the restrictor provides the backpressure required by the kerosene system to support the journal bearings within the fuel control, as well as providing the 'fuel-draulic pressure' required to drive the actuator. Additionally, returning the excess flow to the tank, heat extracted from the oil system (through the kerosene fuel oil heat exchanger (FOHE) 164) can be returned to the airframe fuel tank and dissipated through conduction to the excess fuel/convection to the environment.

Moreover, a mechanical metering modification to the kerosene metering system 154 can be made. Indeed, when operating on the alternative fuel, here hydrogen, the kerosene fuel required for actuator support and heat extraction is not an 'active' value. The flow returned to the tank can be controlled through passive means such as a restricting orifice within the fuel metering unit 154 hydraulic circuit which bypasses the metering valve; returning flow to the tank as a function of regulating valves within the FMU and/or pump speed. Controlling the return to tank flow passively (or mechanically) can eliminate the requirement for FADEC 162 control of the kerosene system when operating on hydrogen. This can alleviate the I/O demand on the FADEC 162 itself, as a metering valve driver and feedback loop is no longer required; as well as eliminating the need for a secondary fuel schedule for the kerosene system when operating on hydrogen. This could simplify the future architecture of the system as additional software and hardware redundancies would not need to be added to the fuel system to support the alternate fuel.

Without providing for circulation of jet fuel through the one or more requiring auxiliary system(s), the system could require an actuation system capable of running off of multiple motive sources (fuel/gas, fuel/pressurized air, fuel/electric). Such modifications could create a significant impact on the architecture of the current flight engine as well as adding weight and complexity to systems which had otherwise been certified and active in production as 'safe for flight' systems. Moreover, additional heat load caused by not circulating fuel flow could place additional loading on the oil system; which may require the addition of heat exchanger surface area to further dissipate heat generated by the oil system. The oil system is part of the engine core and will have similar loading/heat dissipation requirements regardless of the fuel system in use. The fuel system could be 'dead headed', or non-flowing, when operating on the hydrogen system. If dead headed, the fuel within the fuel control would overheat with prolonged use (fuel pumps are still turning) and the internal recirculation within the control may not be sufficient to provide the required amount of backpressure to support the actuation and pump bearings. The high pressure fuel pump bearings, which function as journal bearings during high speed operation in this specific example, are auxiliary systems which require a minimum fuel pressure to provide support to the fuel pump gear shafts. As the fuel temperature increases, the fuel pressure required for bearing support increases.

It will be understood that the expression "controller" as used herein is not to be interpreted in a limiting manner. It is rather used in a broad sense to generally refer to the combination of some form of one or more processing units and some form of non-transitory memory system accessible by the processing unit(s). The use of the expression "controller" in its singular form as used herein includes within its scope the combination of a two or more computers working collaboratively to perform a given function. Moreover, the expression "controller" as used herein includes within its scope the use of partial capacities of a processing unit of an elaborate computing system also adapted to perform other functions. Similarly, the expression "controller" as used herein is not to be interpreted in a limiting manner but rather in a general sense of a device, or of a system having more than one device, performing the function(s) of controlling one or more device(s) such as an electronic device or an actuator for instance.

It will be understood that the various functions of a computer or of a controller can be performed by hardware or by a combination of both hardware and software. For example, hardware can include logic gates included as part of a silicon chip of the processor. Software can be in the form of data such as computer-readable instructions stored in the memory system. With respect to a computer, a controller, a processing unit, or a processor chip, the expression "configured to" relates to the presence of hardware or a combination of hardware and software which is operable to perform the associated functions.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, the auxiliary system can be an auxiliary system of the gas turbine engine, or another auxiliary system of the aircraft. Yet further modifications could be implemented by a person of ordinary skill in the art in view of the present disclosure, which modifications would be within the scope of the present technology.

The invention claimed is:

1. A method of operating an aircraft gas turbine engine having at least one fuel nozzle in fluid communication with a combustion chamber, the method comprising:

conveying a controlled flow rate of a first liquid fuel across a fuel-draulic actuator, including the fuel-draulic actuator using the controlled flow rate of the first liquid fuel for operation;

simultaneously to said conveying a controlled flow rate of the first liquid fuel, returning, via an actuator valve disposed downstream of the fuel-draulic actuator and selectively operable to direct the flow rate of the first liquid fuel to a location upstream of the fuel-draulic actuator or to the at least one fuel nozzle, an entirety of the flow rate of the first liquid fuel from downstream of the fuel-draulic actuator to the location upstream of the fuel-draulic actuator;

and simultaneously to said conveying the controlled flow rate of the first liquid fuel, conveying a controlled flow rate of an alternative fuel to the at least one fuel nozzle.

2. The method of claim 1 wherein said returning includes returning the entirety of the flow rate of the first liquid fuel to a conduit extending between a first liquid fuel reservoir and the fuel-draulic actuator, and wherein the controlled flow rate of alternative fuel is conveyed from an alternative fuel reservoir.

3. The method of claim 2 wherein said returning includes dissipating heat from the first liquid fuel using a heat exchanger.

4. The method of claim 1 wherein said returning includes returning the entirety of the flow rate of the first liquid fuel to a first liquid fuel reservoir.

5. The method of claim 1 wherein said returning includes restricting the flow rate of the first liquid fuel.

6. The method of claim 1 wherein said fuel-draulic actuator has a given minimal value of the first liquid fuel flow rate determined to be sufficient for its operation, wherein the controlled flow rate of the first liquid fuel is set to said minimal value and wherein an engine power requirement in excess of the minimal value is satisfied by the controlled flow rate of the alternative fuel.

7. The method of claim 1, further comprising conveying the controlled flow rate of the first liquid fuel across a fuel to oil heat exchanger upstream of the at least one fuel nozzle, including passing at least some of the controlled flow rate of the first liquid fuel through the fuel to oil heat exchanger and using the controlled flow rate of the first liquid fuel to cool oil in the fuel to oil heat exchanger.

8. The method of claim 1 further comprising communicating a pressure of the controlled flow rate of the first liquid fuel to the fuel-draulic actuator and using the pressure of the controlled flow rate of the first liquid fuel to operate the fuel-draulic actuator.

9. The method of claim 1 wherein said first liquid fuel is jet fuel.

10. The method of claim 1 wherein said alternative fuel is hydrogen.

11. The method of claim 1 wherein said alternative fuel is natural gas.

12. A fuel system for a gas turbine engine having at least one fuel nozzle open to a combustion chamber, the fuel system comprising:

a jet fuel subsystem having a jet fuel conduit extending from a first reservoir area to the at least one fuel nozzle across a fuel-draulic actuator operable using a flow of a jet fuel, at least one fuel delivery system operable to circulate a controlled flow rate of the jet fuel within said jet fuel conduit and across the fuel-draulic actuator, a recirculation conduit branching off from the jet fuel conduit downstream of the fuel-draulic actuator, and an actuator valve operable to selectively direct the flow of the jet fuel to the at least one fuel nozzle or to the recirculation conduit; and an alternative fuel subsystem having an alternative fuel conduit extending from a second reservoir area to said at least one fuel nozzle.

13. The fuel system of claim 12 wherein the recirculation conduit has an outlet fluidly connected to the jet fuel conduit between the first reservoir area and the fuel-draulic actuator.

14. The fuel system of claim 12 wherein the recirculation conduit has a heat exchanger.

15. The fuel system of claim 12 wherein the recirculation conduit has an outlet fluidly connected to the first reservoir area.

16. The fuel system of claim 12 wherein the recirculation conduit includes a flow restrictor.

17. The fuel system of claim 12 wherein the actuator valve is operable to selectively direct an entirety of the controlled flow rate either to the at least one fuel nozzles or to the recirculation conduit.

18. The fuel system of claim 12 wherein the recirculation conduit includes a fuel to oil heat exchanger configured to use the controlled flow rate of the jet fuel to cool oil in the fuel to oil heat exchanger.

19. An aircraft having a gas turbine engine having at least one fuel nozzle open to a combustion chamber and a fuel system comprising:

a jet fuel subsystem having a jet fuel conduit extending from a first reservoir area to said at least one fuel nozzle across a fuel-draulic actuator operable using a flow of a jet fuel, at least one fuel delivery system operable to circulate a controlled flow rate of said jet fuel within said jet fuel conduit and across the fuel-draulic actuator, a recirculation conduit branching off from the jet fuel conduit downstream of the fuel-draulic actuator, and an actuator valve operable to selectively direct the flow of the jet fuel to the at least one fuel nozzle or to the recirculation conduit; and an alternative fuel subsystem having an alternative fuel conduit extending from a second reservoir area to said at least one fuel nozzle.

* * * * *